Figure 1:
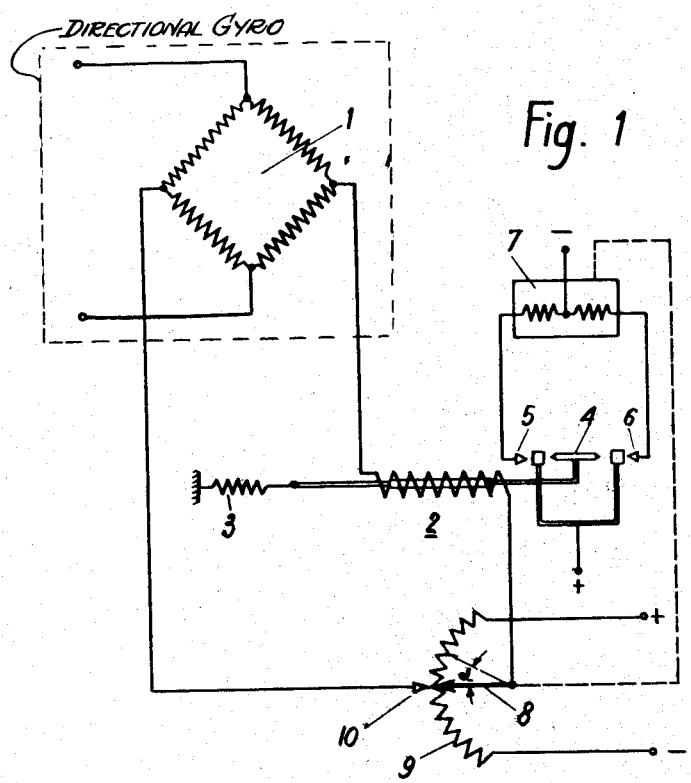

Patented Oct. 8, 1940

2,217,254

UNITED STATES PATENT OFFICE 2,217,254

MEANS FOR AUTOMATIC CONTROL OF AIRCRAFT

Heinrich Langgässer, Berlin-Grunewald, Germany, assignor to Siemens Apparate und Maschinen Gesellschaft mit beschränkter Haftung, Berlin, Germany, a corporation of Germany Application June 10, 1938, Serial No. 213,082
In Germany June 12, 1937

4 Claims. (Cl. 172—282)

This invention relates to automatic control arrangements, more particularly for aircrafts and has for its object an improved electric follow-up control arrangement, in which the follow-up action is produced by the variation of a resistance in the follow-up circuit.

The principles of the present invention are applicable equally to a resistance mounted in a circuit as well as to a bolometric control arrangement. However, as this latter kind of follow-up arrangement is particularly simple and clear, the invention itself and its application will be explained by the way of example in connection with a bolometric control arrangement.

Figure 2:
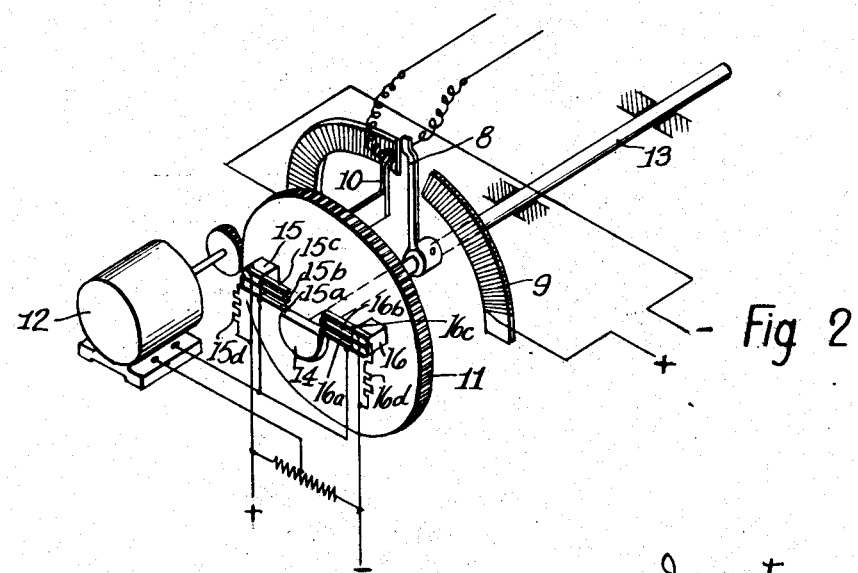

In the drawing; wherein like reference characters refer to like parts, throughout the several views;

Figure 1 is a schematic illustration of a system incorporating the novel follow-up resistance means, and Figure 2 is a perspective view illustrating the mechanical mounting of the respective elements of the follow-up element per se and the electrical control elements thereof.

Referring to Figure 1, a direction indicator which may be of any known type, as used in automatic steering controls, as for instance a directional gyroscope, operates on a bridge arrangement 1 including in its circuit a spring restrained switching relay 2. For a better understanding of the manner in which the bridge is unbalanced by a directional gyro, reference is made to the issued patent to Franz Fischer, No. 2,159,142. The spring 3 of this relay is so adjusted that it holds the switching contact 4, when the relay 2 is not energized, in the middle position between two opposite contacts 5 and 6, so that the path of current to the control member 7 is interrupted. In an automatic aircraft control arrangement, the member 7 will be the rudder motor or an electric coupling device for the rudder control. In the circuit of the relay 2, there is inserted a movable contact lever 8 associated with a potentiometer 9 connected at its electric centre to the circuit of the lever 8 and the relay 2.

When the direction indicator moves relatively to the craft, it thereby produces an unbalance of the bridge to produce a flow of current through the relay 2. For a better understanding of the operation of the direction indicator generally designated by the dotted lines in Fig. 1 upon the resistors of bridge 1, reference is made to the issued patent to Paul Eduard Koster, 2,137,942, wherein gyro controlled resistors are disclosed which may be arranged in a bridge circuit as taught in the issued patent to Franz Fischer, No. 2,159,142. As a result of this, one of the contacts 5 or 6 is closed depending upon the direction of said relative movement and the control member 7 is actuated in one or in another direction. As is well known in devices of the prior art this type of control would lead to hunting and in order to overcome this effect, a follow-up control must be provided, which control in the present device is operated electrically. To this effect, the switching lever 8 is coupled with the control member 7 in any known manner not shown, but generally indicated by the dotted line. Thus, a movement of the member 7 causes the movement of the contact lever 8 away from the position of contact 10 which for the present discussion is assumed to be fixed until the voltage produced on the potentiometer in opposition to the voltage of the bridge circuit equals said bridge voltage. When both voltages counterbalance one another, the relay 2 receives no current and the contact which had been closed by switch member 4 is opened, disconnecting thus the control member 7. The deviation of the lever 8 which is necessary for attaining this result is represented in Figure 1 by the angle α.

In the rigid return type of follow-up, as just described, the further steering movement of the rudder produced by control 7 brings the lever 8 back to zero position as the gyro A returns to its zero position, i. e., the craft is back on its chosen course. In the situation discussed above, the disturbance which moves the craft off its course was assumed to be a temporary one. If, however, a permanent disturbance occurs, such as failure of one engine of a twin-motored craft, a permanent disturbance is present which must be compensated and at the same time the craft must be kept on its course.

The invention has for one of its objects the utilization of a so-called yieldable follow-up control which is obtained by providing, besides a switching or contact member such as formed by the contact lever 8 and which adjusts the follow-up resistance, a second movable switching or contact member 10 which reestablishes upon the follow-up movement the initial relation between the second switching member and the first member with respect to the follow-up circuit resistance. A very simple form of embodiment is obtained when a reversible electric motor is provided for the actuation of the second switching member, this motor being automatically energized as will be described in detail later each time the follow-up operation is initiated. If the follow-up resistance is a potentiometer, its electric zero point is conveniently connected to the reversible motor. An example of embodiment of this arrangement is shown in Figure 2 which shows only the follow-up arrangement without the direction indicator and other control devices. The potentiometer 9 is inserted as a compensating connection in a control circuit for instance as shown in Figure 1. However, the point 10 is no longer a fixed point; on the contrary, the switching lever 10 is carried by a disc 11 adapted to be actuated by reversible motor 12. On the extension of the axis 13 connected to control 7 and carrying the contact lever 8 there is mounted a control cam 14 adapted to actuate two opposed compound contacts 15 and 16. The operation of the device is as follows. When a control action is initiated by the direction indicator, the contact lever 8 is moved by the axis 13 which is coupled with the actuating device in any suitable manner, in order to produce a corresponding voltage on the potentiometer. Simultaneously with the rotation of the axis 13, however, the control cam 14 is also rotated in one direction or in the other and thus one of the contacts 15 or 16 will be closed to start the reversible motor. According to the invention, there is provided a two-stage starting for this motor, which is obtained by energizing the motor first through resistances and then by directly connecting the motor 12 to the current supply line. As seen in Fig. 2, contact 15 is composed of three cooperating contacts 15a, 15b and 15c and contact 16 is similarly composed of three contacts 16a, 16b and 16c. Upon the initial movement of shaft 13 and cam 14, contact 15a, for example, is urged against contact 15b to thereby close a circuit through motor 12 which circuit includes the resistance 15d. Upon further movement of shaft 13 and cam 14, contacts 15b and 15c are closed, thereby short-circuiting resistance 15d out of the circuit for motor 12. Rotation of motor 12, rotates the disc 11 to actuate lever 10. Thus, the contact lever 10 is caused to follow the contact lever 8 at either of two speeds until the connecting points of the contact levers 8 and 10 are again opposite one another with no resistance therebetween.

At this time, if we assume that the craft has been brought back to its course, the bridge 1 is balanced but the rudder is in its displaced position, continuously compensating for the permanent disturbance and at the same time holding the craft upon its course. Upon any changes in course, due to a passing disturbance, the bridge 1 is unbalanced as before and the element 8 is moved from the new zero position to thereby balance any passing disturbance.

What I claim is:

1. The combination of steering apparatus for aircraft, a circuit including a Wheatstone bridge for controlling the operation of said apparatus, a direction controlling member for regulating the current in said bridge when the craft deviates from a predetermined course, a relay in said circuit and energized when current flows in the latter, power means actuated by said relay, a potentiometer electrically connected to one diagonal of said bridge having its effective resistance controlled in response to said power means whereby current flows in opposition to the bridge current thereby de-energizing said relay, and means including a reversible motor for cutting out said resistance from said bridge circuit when the craft assumes its predetermined course.

2. The combination of steering apparatus for aircraft, a circuit including a Wheatstone bridge for controlling the operation of said apparatus, direction controlling means for regulating the current in said bridge when the craft deviates from a predetermined course, means energized in said circuit when current flows in the latter, power means actuated by said energized means, a potentiometer electrically connected to one diagonal of said bridge having its effective resistance controlled in response to said power means whereby current flows in opposition to the bridge current thereby de-energizing said energized means, and a follow-up mechanism actuated in accordance with the operation of said power means for cutting out said resistance from said bridge circuit when the craft assumes its predetermined course.

3. The combination of steering apparatus for aircraft, a circuit including a Wheatstone bridge for controlling the operation of said apparatus, direction controlling means for regulating the current in said bridge when the craft deviates from a predetermined course, a relay in said circuit and energized when current flows in the latter, power means actuated by said relay, a potentiometer electrically connected to one diagonal of said bridge having its effective resistance controlled in response to said power means whereby current flows in opposition to the bridge current thereby de-energizing said relay, and follow-up means including a reversible motor responsive to the operation of said power means for cutting out said resistance from said bridge circuit when the craft assumes its predetermined course.

4. The combination of steering apparatus for aircraft, a circuit including a Wheatstone bridge for controlling the operation of said apparatus, direction controlling means for regulating the current in said bridge when the craft deviates from a predetermined course, a relay in said circuit and energized when current flows in the latter, power means actuated by said relay, a potentiometer electrically connected to one diagonal of said bridge having its effective resistance controlled in response to said power means whereby current flows in opposition to the bridge current thereby de-energizing said relay, and follow-up means comprising a reversible motor, a cam actuated by said power means for operating said motor, and a movable arm for controlling said potentiometer operated by said motor for cutting out said resistance from said bridge circuit when the craft assumes its predetermined course.

HEINRICH LANGGÄSSER.